United States Patent [19]

Klein

[11] 3,852,750
[45] Dec. 3, 1974

[54] NAVIGATION SATELLITE SYSTEM

[75] Inventor: Perry Ian Klein, Washington, D.C.

[73] Assignee: Communications Satellite Corporation, Washington, D.C.

[22] Filed: Oct. 16, 1972

[21] Appl. No.: 298,138

[52] U.S. Cl............................ 343/105 R, 343/100 ST
[51] Int. Cl............................................. G01s 1/30
[58] Field of Search ................... 343/105 R, 100 ST

[56] References Cited
UNITED STATES PATENTS

| | | | |
|---|---|---|---|
| 3,384,891 | 5/1968 | Anderson | 343/100 ST |
| 3,430,234 | 2/1969 | Wright | 343/105 R |
| 3,471,856 | 10/1969 | Laughlin, Jr. et al. | 343/105 R |

Primary Examiner—Maynard R. Wilbur
Assistant Examiner—Richard E. Berger
Attorney, Agent, or Firm—Alan J. Kasper

[57] ABSTRACT

A long range navigation system and method for determining the position of mobile vehicles using synchronous satellites. Three or more synchronous satellites alternately relay a radio frequency carrier amplitude modulated with a plurality of very low frequency tones. Each mobile vehicle is equipped with a communications receiver, including an AM detector and position location equipment. The AM — detected output of the communications receiver is connected to the position location equipment, which determines the position of the vehicle from the relative phases of the tones.

11 Claims, 3 Drawing Figures

NAVIGATION SATELLITE SYSTEM

BACKGROUND OF THE INVENTION

1. Field of the Invention

This invention relates generally to navigational satellites, and more particularly to a navigation satellite system and method which provides navigation for mobile vehicles by transmitting Omega-compatible navigation signals as amplitude modulated tones.

2. Description of the Prior Art

The United States Navy has developed a worldwide position locating system known as Omega. The system has been in operation for several years and is currently being expanded for worldwide coverage. Navigation equipment for operation with Omega is available for both ships and aircraft. The Omega system is described in detail in a publication entitled, "Omega, A World-Wide Navigational System," prepared by the Omega Implementation Committee and published by Pickard and Burns Electronics, 103 Fourth Avenue, Waltham, Mass.

In the Omega system, a plurality of very low frequency transmitters are located in terrestrial stations at known points around the surface of the globe. Each terrestrial transmitter transmits a sequential signal that switches between the three primary Omega frequencies of 10.2 kHz, 11.33 kHz, and 13.6 kHz. The several transmitters of the Omega system are synchronized so that at any particular instant of time, only one transmitter emits a continuous wave signal at a particular frequency. During succeeding intervals of time, the transmitted frequencies are shifted whereby the frequency transmitted from the first station during the first interval is transmitted from succeeding stations during succeeding intervals. Each terrestrial transmitter contains oscillators which are phase locked to a standard time, common to all terrestrial stations, to enable all terrestrial transmitters to transmit with a common phase.

Conventional Omega receiving equipment designed for mobile use generally contains stable oscillators which are individually phase-locked to the separate Omega signals received from three different terrestrial stations. The equipment determines the user's position by measuring the phase difference between pairs of these phase-locked oscillators. Each measured phase difference corresponds to a difference in the distance between two terrestrial transmitters, and thus locates the user on a hyperbolic line of position on an Omega navigation chart, as is well known in the art. Phase measurements made between each different pair of oscillators locates the user on a different hyperbolic line of position, which intersects to identify the vehicle's position on the chart. A description of this measurement technique may be found in the above referenced publication by Pickard and Burns Electronics. Also available are computerized Omega receivers which convert the Omega phase difference measurements to latitude and longitude and display this information to the subscriber. One type of computerized Omega receiver is commercially available from Canadian Marconi Company of Canada.

Each Omega transmitter emits a signal at one of the three primary frequencies at different times to enable the mobile subscriber's position to be obtained with resolvable ambiguity. Phase difference measurements made at a single frequency such as 10.2 kHz produce ambiguities approximately every eight nautical miles. This distance between ambiguities is increased to approximately 72 nautical miles by making pulse measurements at three frequencies, that is, at 10.2 kHz, 11.33 kHz, and 13.6 kHz, thereby increasing the discrimination of the system against false position location.

A major source of navigational error in the Omega system is the variation in the velocity of wave propagation of the VLF Omega signals, which are propagated by ionospheric D-layer reflection. Propagation correction tables are generally used to correct for differences in time of day, season of the year, and approximate longitude and latitude at the observation point. However, even when these corrections are applied, navigation errors can sometimes reach ten nautical miles or more, especially during sudden ionospheric distrubances or periods of polar cap anomolous propagation.

A second source of difficulty in operation with Omega is the large amount of noise encountered in the 10 to 14 kHz region of the spectrum in which the system operates. Precipitation static, local vehicle power system noise, and electrical storms can each interrupt reception. This problem is compounded by the limited strength of the received signals due to the low efficiencies of transmitting and receiving antennas at these frequencies.

Prior art systems which have proposed to use VLF Omega signals in combination with communications satellites suffer from the same disadvantages. Characteristic of these systems is U.S. Pat. No. 3,471,856 issued to C. R. Laughlin, Jr. et al. on Oct. 7, 1969. In that system each mobile subscriber receives conventional VLF Omega signals from terrestrial transmitters and then angle modulates these signals onto a radio frequency carrier for transmission to a synchronous satellite. The satellite relays the modulated carrier to a central terrestrial station which calculates the position of the mobile subscriber. However, because the satellite in such systems acts only to relay ionospheric propagated Omega signals from the mobile vehicle to a central station, these systems possess the same deficiencies as the basic terrestrial Omega system. In addition, because these systems utilize angle modulation techniques, relatively high power transmitters are required aboard the satellite in order to maintain the signal to noise ratio at the terrestrial receiver above the detection threshold required for angle modulation detectors.

SUMMARY OF THE INVENTION

The present invention overcomes the above disadvantages by using three or more synchronous satellites to relay navigational signals transmitted from a central ground station. Transmissions to and from the satellites take place at a higher frequency than that used by conventional Omega transmitters. For example, frequencies in the VHF (30–300 MHz), UHF (300–3000 MHz), or SHF (3,000–30,000 MHz) region of the spectrum may be used. Propagation from the satellites to the mobile vehicles at these frequencies is line-of-sight and therefore not subject to the uncertainties produced by ionospheric propagation. Atmospheric and man-made noise are also less of a problem at the higher frequencies used by the present invention. The present invention offers the further advantage that the geometry of a satellite system results in ambiguity distances larger than those which can be achieved with conventional Omega transmitters, and consequently reduces the possibility of ambiguity.

A further advantage of the navigation satellite system disclosed herein is that the mobile subscribers may use conventional Omega receivers by simply connecting the amplitude demodulated output of a communications receiver to the antenna input of a conventional VLF Omega receiver.

In accordance with the present invention, the sum of one or more of the three conventional Omega tones is transmitted on an amplitude modulated carrier from a central ground station sequentially to a minimum of three synchronous communications satellite relays. The synchronous satellites relay the amplitude modulated carrier in the normal Omega format, except that only one satellite transmits at a time. That is, the sum of one or more of the three tones is relayed by the first satellite followed by the second satellite, followed by the third satellite. This format permits a single channel communications receiver to be used aboard the mobile vehicle without the mutual interference that would result if the three satellites transmitted simultaneously on the same carrier frequency. Because the subject invention, unlike past navigational satellite techniques, uses amplitude modulation rather than angle modulation to modulate the carrier with navigational signals, and because Omega equipment can function at signal-to-noise ratios much less than unity, relatively low satellite transmitter powers may be used without encountering the signal detection thresholds found with angle modulation systems.

The Omega position determination equipment used is generally the same as that used in the prior art. The conventional Omega equipment located aboard the mobile vehicle measures the phase differences of corresponding Omega tones transmitted from different satellites and the computerized Omega receiver converts the phase difference measurements to latitude and longitude and displays this information to the mobile subscriber as is well known in the art. The mobile subscriber's position may also be determined through the use of maps furnished in a form analogous to conventional Omega navigation charts, along with movable, transparent line-of-position overlays which are used to adjust for changes in the satellite positions. Alternatively, the slight motion of synchronous satellites can be predicted over a period of time and accounted for in correction tables presented to the subscriber in much the same form as the ionospheric correction tables presently supplied for the conventional Omega system.

DESCRIPTION OF PREFERRED EMBODIMENT

Figure 1:
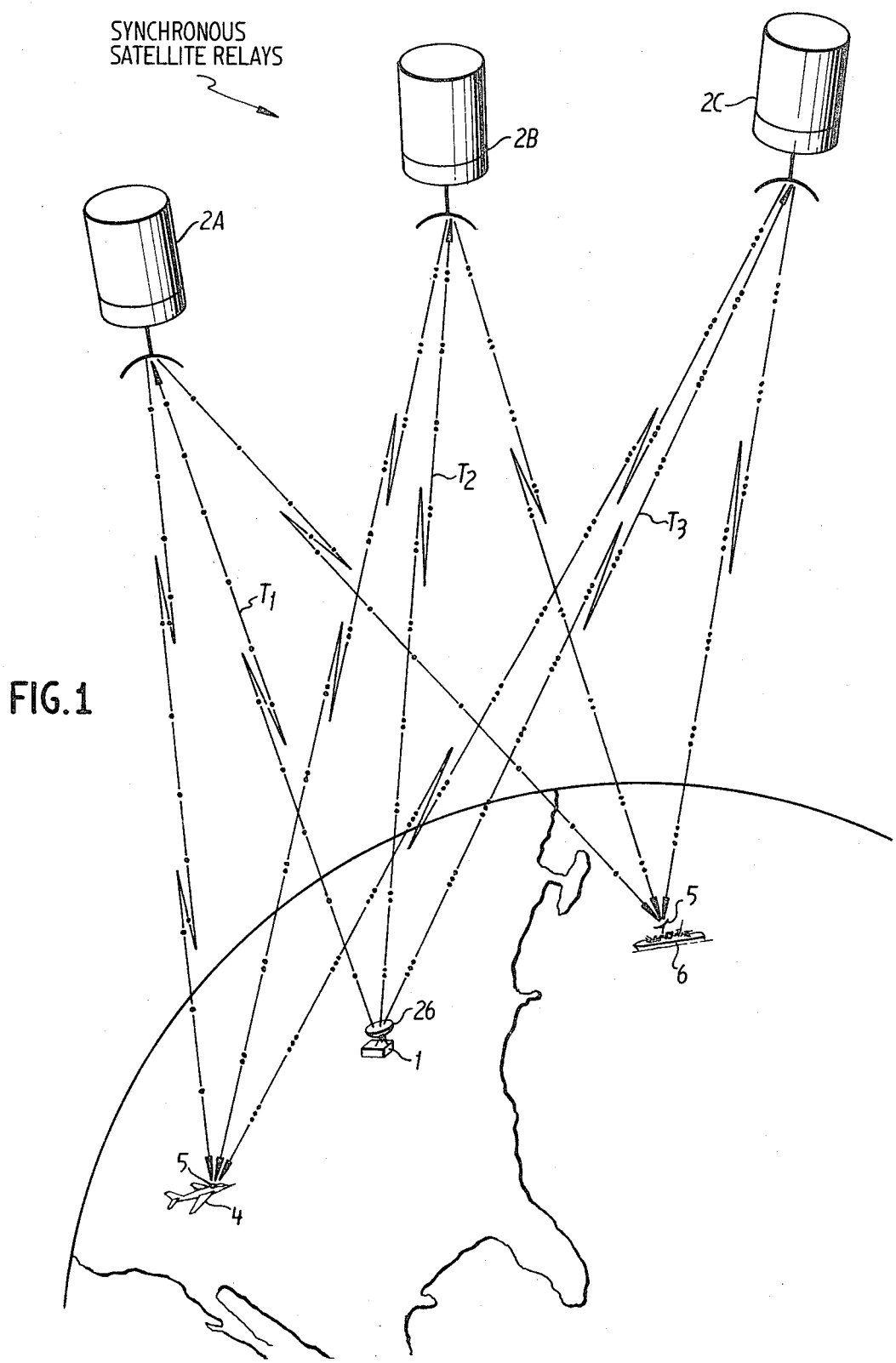
FIG. 1 is a schematic diagram illustrating the principles of the present invention.

Referring to FIG. 1, therein is shown a navigation satellite system employing the principles of the present invention. A central ground station 1 sequentially at times $T_1$, $T_2$ and $T_3$ transmits a radio frequency carrier, amplitude modulated with the sum of the three Omega tone frequencies, to three synchronous satellite relays 2A, 2B, and 2 C, respectively, using electronically steerable antenna 26. While three synchronous satellite relays have been shown for purposes of the discussion, it should be understood that three satellite relays are a minimum and any number may be used to achieve the desired coverage. The RF carrier, amplitude modulated with Omega signals, is relayed from synchronous satellites 2A, 2B, and 2C to mobile subscribers, illustrated in FIG. 1 as an airplane 4 or ship 6. Each mobile subscriber contains receiving equipment 5 which uses the radio frequency signals received from synchronous satellites 2A, 2B and 2C to locate its position.

Figure 2A:
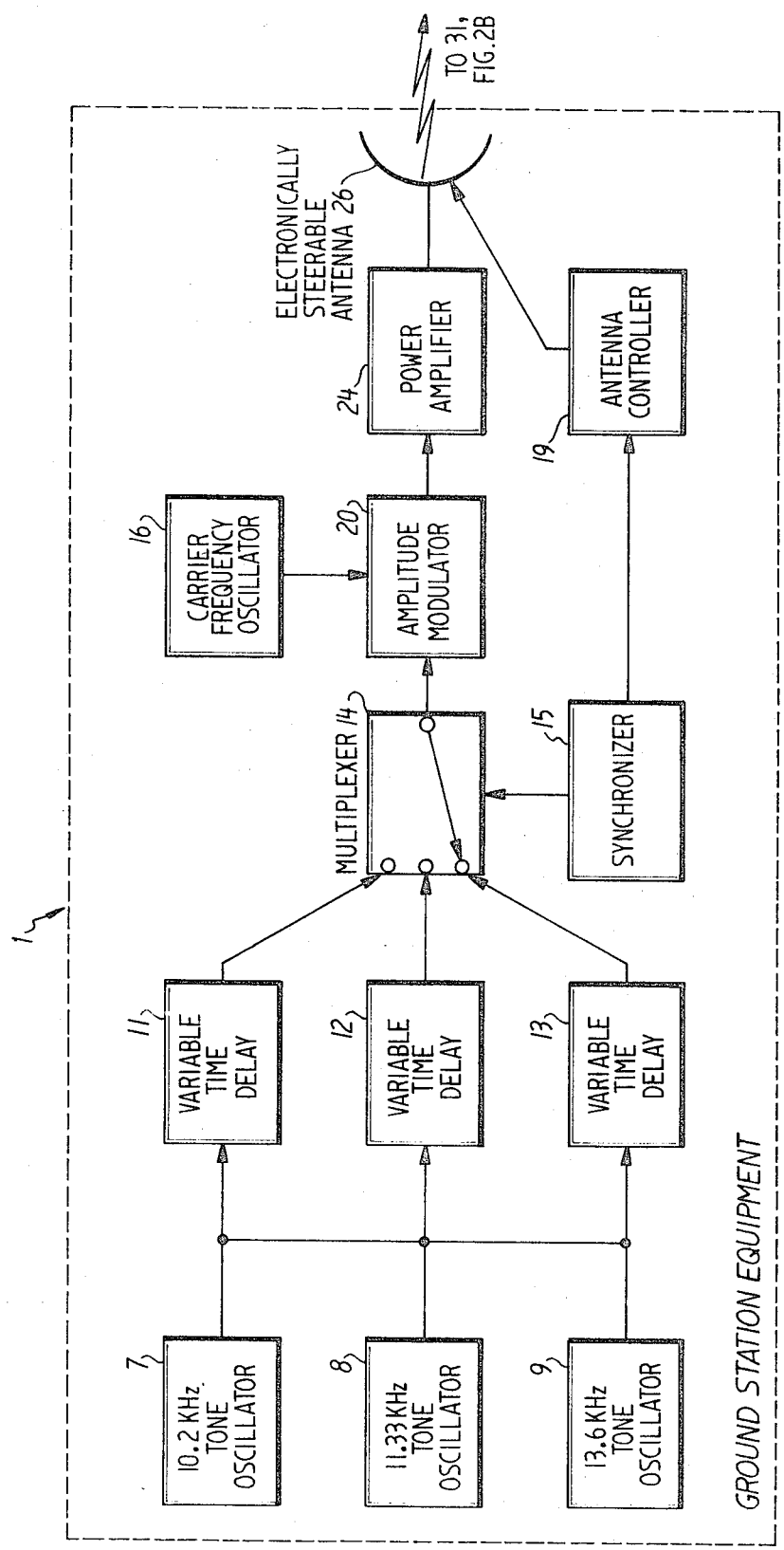
FIGS. 2A and 2B are block diagrams illustrating the details of certain hardware of FIG. 1.
Figure 2B:
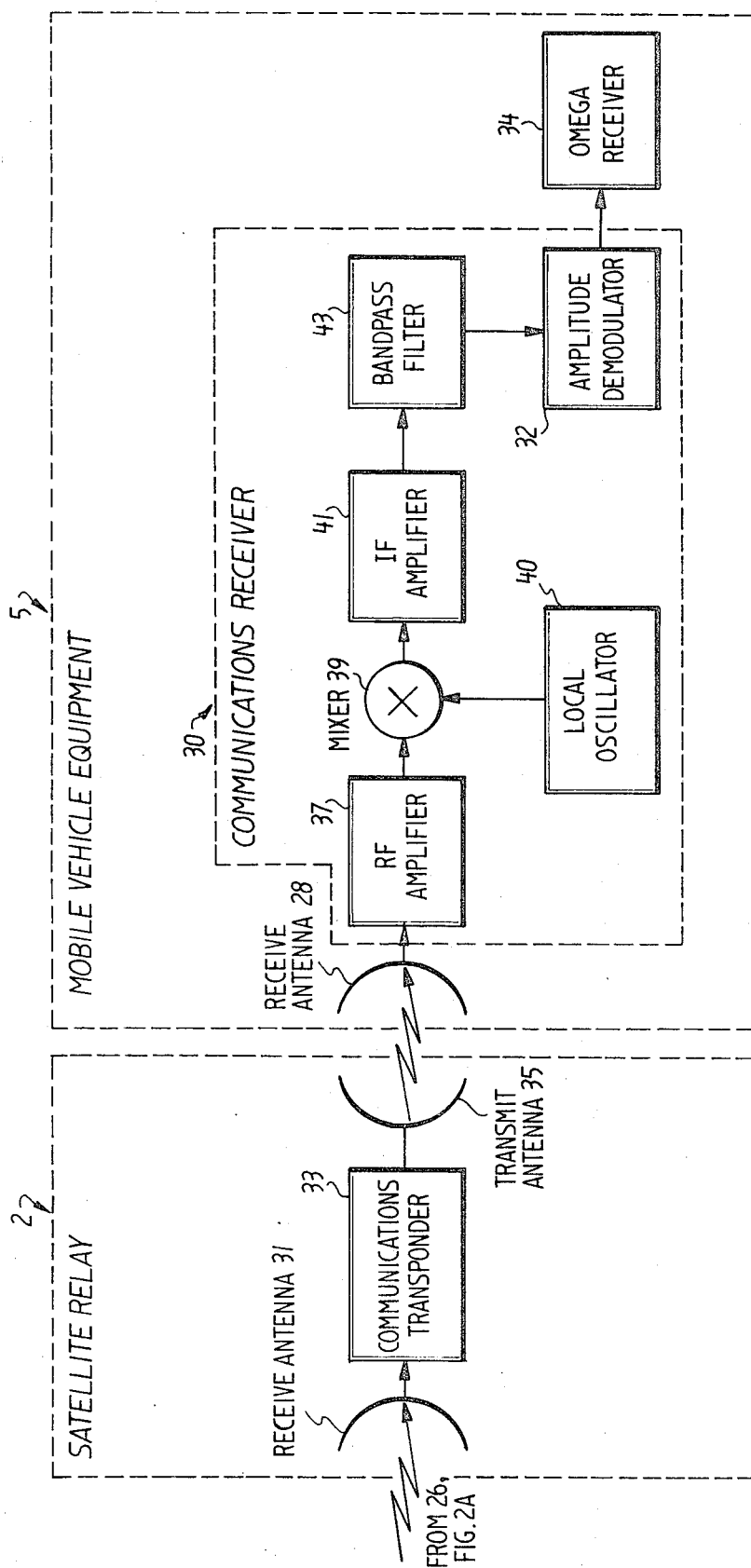

Referring to FIG. 2, therein are shown the details of the ground station transmission equipment 1 and the details of the mobile subscriber's reception equipment 5. The navigational transmission equipment for ground station 1 includes three oscillators 7, 8, and 9 precisely tuned to the conventional Omega frequencies of 10.2 kHz, 11.33 kHz, and 13.6 kHz, respectively. While for purposes of discussion three separate oscillators have been shown, it should be understood that the frequencies of oscillators 7, 8, and 9 may also be derived by any suitable technique that is known in the art such as by synthesizing from or digitally dividing the output frequency of a highly stable crystal oscillator or an atomic frequency standard.

The output of each oscillator 7, 8, and 9 is connected to the three variable time delay devices 11, 12, and 13, such that each variable time delay receives simultaneous signals from all three oscillators 7, 8, and 9.

Each variable time delay device corresponds to one satellite relay in the system. Thus, variable time delays 11, 12, and 13 correspond to satellites 2A, 2B, and 2C, respectively. Time delays 11, 12, and 13 are adjusted to equalize the propagation delays to satellites 2A, 2B, and 2C, respectively, so that each modulated tone is received and relayed from the satellite relays 2A, 2B, and 2C with the same phase. Variable time delays 11, 12, and 13 may consist of adjustable delay lines or any other suitable means well known in the art to shift the phase of the modulated tones. Variable time delays 11, 12, and 13 should be periodically adjusted to compensate for variations in distance between ground station 1 and satellite relays 2A, 2B, and 2C, respectively. The adjustments can be made manually or automatically utilizing techniques known in the art.

The respective outputs of variable time delays 11, 12, and 13 are each connected to a separate input terminal of a multiplexer 14. The multiplexer 14 sequentially connects the outputs of each variable time delay 11, 12, and 13 to an amplitude modulator 20. The time and duration of the connection of each variable time delay 11, 12, and 13 to amplitude modulator 20 is controlled by synchronizer 15.

Carrier frequency oscillator 16 provides the carrier frequency to amplitude modulator 20. The amplitude modulated radio frequency output of amplitude modulator 20 is amplified by power amplifier 24. The output of radio frequency power amplifier 24 is connected to an electronically-steerable directional antenna 26 for transmitting the uplink modulated carrier to each of the satellite relays 2A, 2B, and 2C in succession. The antenna direction is controlled by antenna controller 19 which successively directs the antenna output to each of the synchronous satellites 2A, 2B, and 2C.

The antenna controller 19 uses synchronizing signals received from synchronizer 15 to control the time and duration of the RF link established between steerable antenna 26 and the satellite relays 2A, 2B, and 2C such that each satellite relay 2A, 2B, and 2C receives RF transmissions modulated only with the output of its associated variable time delay device 11, 12, and 13, respectively. Thus, when antenna 26 is directed toward satellite relay 2A, multiplexer 14 connects variable time delay 11 to amplitude modulator 20. Next, the direction of antenna 26 is shifted to another satellite relay such as 2B and the multiplexer 14 connects the appropriate variable time delay device (in this example 12) to amplitude modulator 20. In the normal Omega format the duration of each satellite-to-user transmission is approximately 1 second.

Synchronizer 15 may be an internal clock or any other apparatus well known in the art suitable to synchronize the transmission from ground station 1 to each of the satellite relays 2A, 2B, and 2C with the rate of commutation of multiplexer 14. By way of example, synchronizer 15 may contain a high precision crystal oscillator and digital frequency dividers which periodically output pulses to multiplexer 14 and antenna controller 19.

While the Omega signals have been shown as amplitude modulated tones on the uplink carrier for purposes of discussion, it should be understood that phase or frequency modulation techniques may also be used for modulation of the uplink carrier. Similarly, it is also possible to phase or frequency modulate the downlink carrier. However, it is preferred to amplitude modulate the downlink carrier with the Omega signals to allow use of a satellite transponder with a relatively low transmitter power.

While an electronically steerable antenna has been shown at ground station 1 for purposes of discussion, it should be understood that any suitable antenna available in the art capable of changing directions within approximately 0.1 second may also be used. Separate directional antennas for each satellite relay may also be used. It is also possible to use a wide beam antenna at ground station 1 and time or frequency division multiplex the uplink transmissions from ground station 1 to synchronous satellites 2A, 2B, and 2C, or to command each satellite emission on or off.

Satellite relays 2A, 2B, and 2C are identical communications satellites in synchronous orbit. Any suitable satellite relay may be used. Such satellites are well known in the communications art and generally include receive antenna 31 for reception of uplink RF carriers. The uplink carrier is amplified by suitable transponder equipment 33. The output of transponder equipment 33 is connected to satellite transmit antenna 35 which radiates the amplified downlink RF carrier to mobile subscribers. Transponder equipment 33 may include frequency translators as is well known in the art to change the uplink carrier frequency to a different downlink carrier frequency. The satellite transmit antenna 35 is preferably a wide beam antenna having global coverage. However a scannable directional antenna as is well known in the art may also be used for downlink radiation. In operation such an antenna would repeatedly scan the globe providing intermittent coverage to all subscribers.

Each satellite relay 2A, 2B, and 2C of the present invention receives the amplitude modulated RF carrier transmitted by ground station 1 and relays the amplitude modulated navigation signals to mobile subscriber reception equipment 5. In the preferred embodiment, satellite relays 2A, 2B, and 2C use identical carrier frequencies for downlink transmission in order that identical single channel communications receivers 30 may be used by each mobile subscriber. However, it is also possible to use an identical multiple channel receiver for each mobile subscriber. This will permit each satellite relay 2A, 2B, and 2C to transmit on separate frequencies.

While for purposes of discussion the synchronous satellites 2A, 2B, and 2C have been shown as relaying an Omega modulated carrier originating from a central ground station 1, it should be understood that the Omega modulated transmission may originate from the synchronous satellites 2A, 2B, and 2C. In that case the transmission equipment required to originate the Omega frequency must be located aboard each synchronous satellite. In addition, provision must be made to maintain synchronization between the respective synchronizer and variable time delay of each of the satellites 2A, 2B, and 2C such that only one satellite will transmit at a time and the modulated tones will be transmitted in phase. Such synchronization techniques are well known in the art. However, because of the added equipment required to originate the navigation transmission from the synchronous satellites 2A, 2B, and 2C, it is preferred to originate the transmission from a central ground station 1.

In system operation, each synchronous satellite 2A, 2B, and 2C alternately relays, for specified intervals, an RF signal amplitude-modulated with the sum of the three Omega frequencies. That is, a first satellite such as 2A will relay an RF carrier amplitude modulated with the combined outputs of oscillator 7, oscillator 8, and oscillator 9. A second satellite such as 2B will then relay the same carrier modulated with the combined outputs of oscillator 7, oscillator 8, and oscillator 9. This will then be followed by an identical transmission from a third satellite such as 2C. The time and duration of the transmission from each of the synchronous satellites 2A, 2B, and 2C is under control of ground station 1. By transmitting the navigation signals from synchronous satellites 2A, 2B, and 2C in a time divided manner, mutual interference between the synchronous satellites is avoided.

Each mobile vehicle contains navigation reception equipment 5 which includes a receiving antenna 28. The satellite signals received by antenna 28 are input to a communications receiver 30 which includes an RF amplifier 37 connected to a mixer 39. The amplified RF input from RF amplifier 37 is mixed with the output of a local oscillator 40 to produce an IF signal. The IF signal is then amplified by IF amplifier 41 which is connected to a bandpass filter 43. Bandpass filter 43 reduces the relatively wide IF noise bandwidth to a narrow bandwidth centered about the navigation carrier signal. Bandpass filter 43 is used to enable the communications receiver 30 to operate at very low signal-to-noise ratios. By filtering out a large portion of the unwanted noise accompanying the IF signal before detection by amplitude demodulator 32, the noise bandwidth is decreased without any reduction in the desired signal, and the predetection signal-to-noise ratio is thereby improved.

The output of bandpass filter 43 is connected to amplitude demodulator 32. The demodulator 32 separates the amplitude modulated Omega signals from the IF carrier. The demodulator 32 may take the form of an envelope detector, square law detector or phase locked loop. Such amplitude demodulation techniques are well known in the art. The output of demodulator 32 is connected to the antenna input of a conventional Omega receiver 34. The conventional Omega receiver 34 uses the AM detected signals to determine the position of the mobile subscriber in the manner identical to conventional Omega navigational equipment.

What is claimed is:

1. A method of determining the position of an object comprising:
   a. transmitting in succession from each of at least three synchronous satellites an RF carrier, said carrier being modulated with at least one very low frequency (VLF) tone;
   b. receiving said successive transmissions at said object;
   c. demodulating said successive transmissions;
   d. measuring the phase difference between tones of the same frequency transmitted from different ones of said satellites;
   e. using two or more of said measured phase differences to determine the location of said object.

2. The method of claim 1 wherein said RF carrier originates from a central station and is transmitted in succession from said ground station to each of said satellites.

3. The method of claim 2 wherein said RF carrier is amplitude modulated and said ground station includes means for time delaying the modulation of said RF carrier whereby said tone is transmitted with the same phase from each synchronous satellite.

4. The method of claim 3 wherein said RF carrier is modulated with the sum of the VLF tones of 10.2 kHz, 11.33 kHz and 13.6 kHz.

5. A navigation satellite system for providing mobile objects with information that will enable a determination of their geographic position comprising:
   a. at least three synchronous satellites, each including means for transmitting a radio frequency carrier, modulated with a plurality of very low frequency (VLF) tones;
   b. radio frequency receiving means located at each of said objects and including means for demodulating each of said radio frequency carriers to derive said plurality of VLF tones;
   c. VLF receiving means connected to said radio frequency receiving means including means for measuring the phase difference between identical ones of said tones transmitted from different ones of said satellites.

6. A navigation satellite system as claimed in claim 5 wherein said VLF tones comprise the frequencies of 10.2 kHz, 11.33 kHz and 13.6 kHz.

7. A navigation satellite system as claimed in claim 6 further comprising:
   a. a central station including means for transmitting a modulated radio frequency carrier at a first frequency to each satellite in sequence; and, wherein said satellite includes means for receiving the central station carrier and for connecting said received carrier to a transmitter for transmission to the mobile object at a carrier frequency different from said first carrier frequency.

8. A navigation satellite system as claimed in claim 7 wherein said central station comprises:
   a. first, second, and third very low frequency oscillators;
   b. first, second, and third time delay means each corresponding to a different one of said three synchronous satellites and each receiving signals from said first, second and third very low frequency oscillators;
   c. multiplexing means for sequentially sampling said first, second, and third time delay means;
   d. modulator means connected to said multiplexing means for producing a radio frequency carrier amplitude modulated with the output of said multiplexing means; and
   e. directional antenna means for transmitting the amplified output of said modulator means to each of said three synchronous satellites in succession.

9. A navigation satellite system as claimed in claim 8 wherein said central station further comprises:
   a. synchronizing means for providng control signals to said multiplexing means and said antenna means whereby said multiplexing means connects the respective output of each of said first, second, and third time delay means to said modulator means at the same time the antenna means is transmitting to the synchronous satellite associated with that time delay means.

10. A navigation satellite system as claimed in claim 9 wherein said antenna means comprises a steerable directional antenna and antenna control means for alternately steering the antenna beam in the direction of each of said synchronous satellites in response to control signals from said synchronizing means.

11. A navigational satellite system as claimed in claim 8 wherein said first, second, and third time delay means are variable to permit compensation for relative drift in the distances between said first, second, and third synchronous satellites from said ground station.

* * * * *